(12) United States Patent
Rammal

(10) Patent No.: US 8,682,792 B2
(45) Date of Patent: Mar. 25, 2014

(54) SECURE PAYMENT AND BILLING METHOD USING MOBILE PHONE NUMBER OR ACCOUNT

(75) Inventor: Karim Anwar Rammal, New York, NY (US)

(73) Assignee: Net2Text Ltd, New York, NY (US)

( * ) Notice: Subject to any disclaimer, the term of this patent is extended or adjusted under 35 U.S.C. 154(b) by 62 days.

(21) Appl. No.: 13/148,043

(22) PCT Filed: Feb. 11, 2010

(86) PCT No.: PCT/US2010/023863
§ 371 (c)(1),
(2), (4) Date: Aug. 4, 2011

(87) PCT Pub. No.: WO2010/093770
PCT Pub. Date: Aug. 19, 2010

(65) Prior Publication Data
US 2011/0295750 A1 Dec. 1, 2011

Related U.S. Application Data

(60) Provisional application No. 61/152,696, filed on Feb. 14, 2009.

(51) Int. Cl.
*G06Q 40/00* (2012.01)
*G06Q 20/32* (2012.01)
(52) U.S. Cl.
CPC .................................... *G06Q 20/32* (2013.01)
USPC .............................................. 705/44; 705/39
(58) Field of Classification Search
CPC ...................................................... G06Q 20/32
USPC .............................................................. 705/39
See application file for complete search history.

(56) References Cited

U.S. PATENT DOCUMENTS

| | | | |
|---|---|---|---|
| 5,991,749 A | 11/1999 | Morrill, Jr. | |
| 2004/0019564 A1* | 1/2004 | Goldthwaite et al. | 705/44 |
| 2005/0086164 A1 | 4/2005 | Kim et al. | |
| 2005/0222917 A1 | 10/2005 | Moore et al. | |
| 2006/0131390 A1* | 6/2006 | Kim | 235/380 |
| 2006/0253392 A1* | 11/2006 | Davies | 705/40 |

(Continued)

FOREIGN PATENT DOCUMENTS

| | | |
|---|---|---|
| CN | 1618201 A | 5/2005 |
| JP | 2006-338414 | 12/2006 |

(Continued)

*Primary Examiner* — William Rankins
(74) *Attorney, Agent, or Firm* — Carlos R. Villamar; The Villamar Firm PLLC

(57) ABSTRACT

A system, method and computer program product for processing payments for goods or services, including a payment processor that receives a payment request from a merchant for goods or services and that includes a mobile phone number or mobile phone account of a user, sends a payment authorization request text message to the mobile phone requesting payment authorization, and receives a payment authorization text message from the mobile phone authorizing or not authorizing the payment. If the payment is authorized, the payment processor pays the merchant and charges the mobile phone account for the payment. If the payment is not authorized or if the payment is not received within a predetermined period of time, the payment processor declines to pay the merchant for the goods or services.

12 Claims, 15 Drawing Sheets

(56) References Cited

U.S. PATENT DOCUMENTS

| | | |
|---|---|---|
| 2006/0278704 A1 | 12/2006 | Saunders et al. |
| 2007/0063017 A1 | 3/2007 | Chen et al. |
| 2007/0095892 A1* | 5/2007 | Lyons et al. ............... 235/379 |
| 2008/0288351 A1 | 11/2008 | Leung et al. |
| 2009/0144163 A1* | 6/2009 | Dickelman ................ 705/17 |

FOREIGN PATENT DOCUMENTS

| | | |
|---|---|---|
| KR | 10-2008-0005800 | 1/2008 |
| KR | 10-2008-0096721 | 11/2008 |
| KR | 1020080096721 A | 11/2008 |
| WO | WO03049364 A1 | 6/2003 |

* cited by examiner

SECURE PAYMENT AND BILLING METHOD USING MOBILE PHONE NUMBER OR ACCOUNT

CROSS REFERENCE TO RELATED APPLICATIONS

The present invention is based on and claims the benefit of priority from U.S. Provisional Patent Application Ser. No. 61/152,696 of Rammal et al., entitled "SECURE PAYMENT AND BILLING METHOD USING MOBILE PHONE NUMBER OR ACCOUNT," filed on Feb. 14, 2009, the entire contents of the disclosure of which are hereby incorporated by reference.

BACKGROUND OF THE INVENTION

1. Field of the Invention

The present invention generally relates to methods and systems for conducting secure purchase and payment transactions, and more particularly to a method, system and computer program product for conducting secure purchase and payment transactions using a mobile phone.

2. Discussion of the Background

Customers in today's world have unprecedented access to retailers and merchants selling goods and/or services of all types in stores, through vendors and vending machines, restaurants and the internet. Beyond the traditional shopping practice of buying goods and services in ones own neighborhood, town, city, and country, access to foreign goods and services is made possible through travel and/or the internet.

Once customers select their goods, they have several options to pay the retailer/merchant with. While cash is still "king," customers have other payment options such as using credit cards, debit cards and payment service providers that act on behalf of customers as intermediaries between financial institutions and retailers to try and protect customer's financial and personal information. Other payment options also include, pre-paid credit/debit cards, stored value cards, bank checks, bank transfers, travelers checks, money order, demand drafts, money transfer using a third independent financial entity, E-mail payments, and mobile wallet applications that act as intermediaries or interfaces between a customer's financial institution (typically a bank or a credit card company) and the retailer/merchant. Certain computer based financial services software programs also provide transaction payment features.

However, all these payment options have their merits and demerits and various complexities. Customers are still weary about giving their credit card and personal information to pay for purchases on the internet, even at stores, restaurants and vending machines as fraud and identity theft cases have occurred and are on the rise. Given the surge in identity theft, one can't blame customers for fearing the worst. In addition, use of the other financial transaction instruments may be costly or sheer complex cumbersome.

Accordingly, customers are constantly looking to simplify their life and reduce complexities in any way possible as long as it doesn't jeopardize their personal or financial security. Given that security, fraud and identity theft are major concerns, it is imperative that customers are protected. Customers are also weary of unreasonable hidden costs that are additionally charged by credit cards, mobile wallets and other financial instruments that are above and beyond what the retailer is already charging.

Conventional systems of payment and methods using mobile phones have limitations, including requiring downloading of complex software, need to use hi-tech mobile phones, need for additional security codes, hidden costs, and additional charges by the customer's bank or credit card company. In addition, such complex mobile phone payment systems and other payment methods are also limited in their availability and usage for the world's population at large that purchases goods and services. The estimate for the world's population stands at 6.6 billion in 2008. Less than 30% of the world's population has credit cards. However, almost 70% of the world's population has a mobile phone and an active mobile account and a robust system and method to leverage this market has yet to be developed.

SUMMARY OF THE INVENTION

Accordingly, there is a need for a method and system that addresses the above and other problems with convention transaction and payment systems to leverage the opportunity for a mobile phone user, anywhere in the world, with the most basic mobile phone device, a mobile number/account, and a mobile phone service provider to be able to pay for goods and services locally as well as globally using their mobile phone number/account. The above and other needs are addressed by the exemplary method and system for conducting secure purchase payment transactions using a mobile (e.g., a cell phone) phone number (or e.g., a mobile phone account number) which, at the prompt of the retailer, via a payment processor and the customer's mobile phone service provider, is then approved and authenticated by the customer/user using their unique password or PIN Code, and hence their mobile phone account is debited by the mobile phone service provider (e.g., who may or may not include an additional charge) who then pays the payment processor who then pays the retailer.

Accordingly, in exemplary aspect of the present invention there is provided a novel system, method and computer program product for processing payments for goods or services, including a payment processor that receives a payment request from a merchant for goods or services and that includes a mobile phone number or mobile phone account of a user, sends a payment authorization request text message to the mobile phone requesting payment authorization, and receives a payment authorization text message from the mobile phone authorizing or not authorizing the payment. If the payment is authorized, the payment processor pays the merchant and charges the mobile phone account for the payment. If the payment is not authorized or if the payment is not received within a predetermined period of time, the payment processor declines to pay the merchant for the goods or services.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Figure 1:
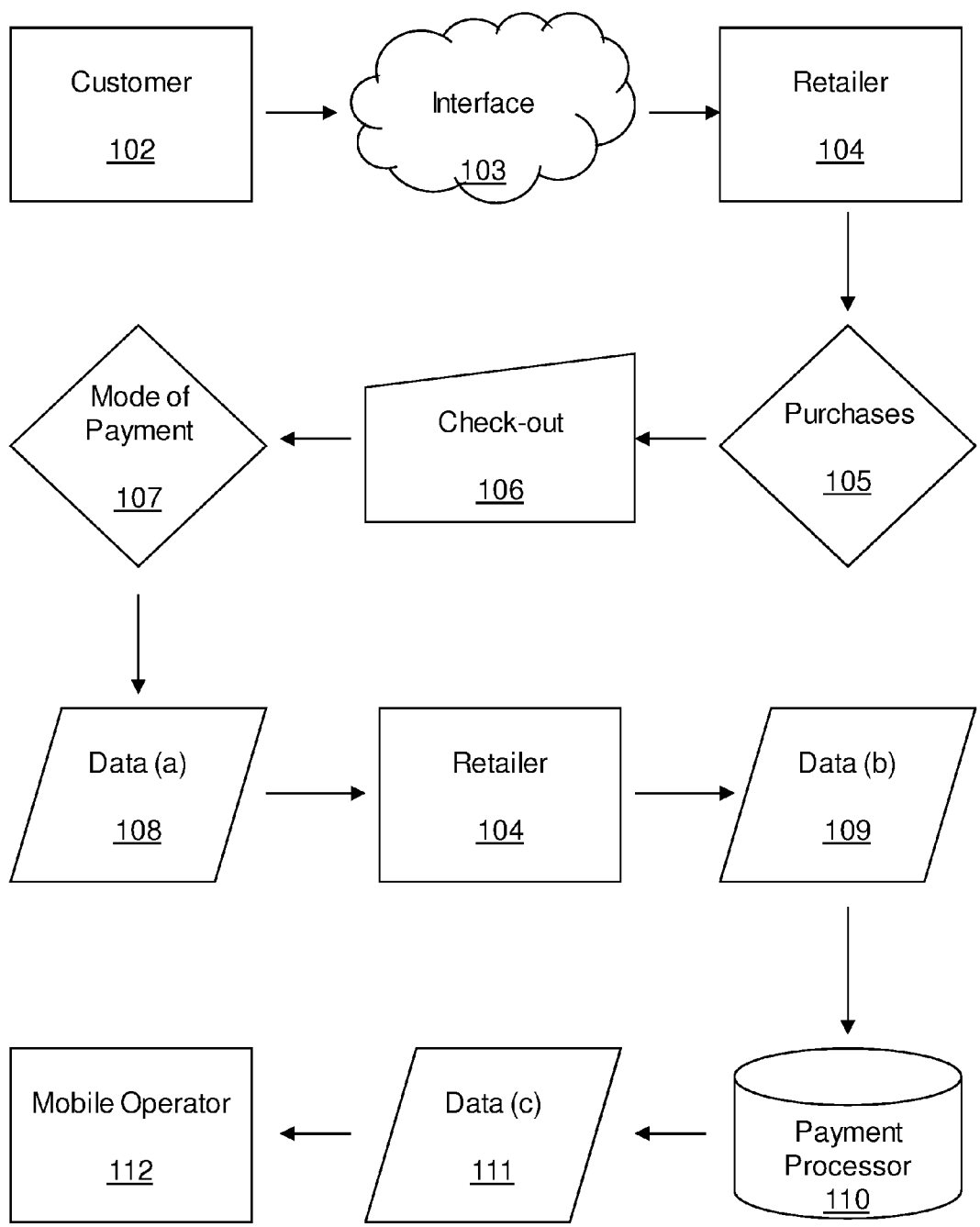
FIGS. 1-2 illustrate an exemplary process for customers to purchase goods and/or services from a retailer.

The present invention includes recognition of and addresses problems associated with conventional systems such those described in U.S. Pat. No. 5,991,749 and U.S. Patent Application Nos. 20050086164; 20050222917; 20070063017; and the like. Although such systems and methods may provide peer to peer deposits and value transfers, mobile device identification centric authentication, mobile wallet software, voice activated and device based user prompted payment functions, and mobile banking, etc., to address payment security and convenience to a certain level, such conventional system and methods still may compromise security, leave customers vulnerable to identity theft, and require complex customer billing systems and procedures. Advantageously, the exemplary method and system for conducting secure purchase payment transactions using a mobile phone number recognizes and addresses these and other limitations with such conventional systems and provide customer control over payment authorization, identity protection, and security through a simple and convenient payment method.

Advantageously, the novel method and system of the exemplary embodiments addresses the above and other problems with conventional payment processing systems and methods and allow the 4 billion plus and growing mobile phone users worldwide to pay for goods and services through their mobile phone service provider, using their mobile phone number and/or mobile phone account number (also referred to as "mobile number" or "mobile phone number") securely for goods and/or services they purchase locally and/or globally. The novel system and method enables online and offline commerce transactions using mobile phone numbers, with customers being billed by their mobile phone service provider/operator/carrier (also referred to as "mobile operator").

The novel system and method, advantageously, provides a simple and secure payment system based on a novel process that enables a customer to remain in control of the payment authorization process by using their mobile phone number to pay for purchases of goods and services, for example, at the point of sale or via the internet, via telephone sales persons or other interactive interfaces, via vending machines, other such retail environments and interfaces, and the like, or any other suitable way that a retailer or merchant may be selling goods and/or services, locally or globally, and get billed for the transaction by their mobile operator who then settles payment on the customer's behalf with the retailer through a payment processor.

As compared with conventional systems, the novel system and process does not require mobile phone users to download any additional software on to their mobile phone devices, as long as their mobile phones are able to receive and send Short Message Service (SMS) text messages, and the like. Nor are users required to register or create any financial relationship with a retailer or vendor or a transaction payment processing/clearing house (also referred to as "payment processor"). Nor do users need to disclose their password or personal identification (PIN) code, and the like, to a retailer or a payment processor, advantageously enhancing security levels and protection against financial fraud and identity theft. By not requiring customers to establish a relationship between their financial institutions (e.g., banks, credit card companies, money managers and others) and/or retailers, and/or payment processors, the novel system and method provides a customer with the advantage of always being in control of authorizing the transaction payment, which is eventually billed to them through their mobile operator.

The exemplary method involves a customer buying goods and/or services and opting to pay for the goods and/or services through their mobile operator by providing the retailer their mobile number (and e.g., related information where necessary, such as country that the mobile number is issued in and the name of the mobile operator that issued the mobile number, such as AT&T or T-Mobile or Verizon, etc.). The retailer then requests the customer's mobile operator's approval, and customer authentication and authorization to bill the payment charge to the customer's mobile number with the amount of the purchase (the customer's mobile operator may or may not add a surcharge in the case of pre-paid and may or may not in the case of post-paid customers) through a payment processor, for example, of a company that offers this novel service to retailers, mobile operators, and customers.

The mobile operator checks the customer's mobile number account balance (or charge protocols that can be set mutually with post-paid and/or pre-paid customers) and if found sufficient to pay for the purchase (and any additional charges that the mobile operator may levy), sends a SMS text message to the customer on their mobile number giving them details of the retailer and the total amount payable (which may or may not include additional charges of the mobile operator), and requesting a response from the customer for approval via text message, replying with their unique PIN Code associated with the customer's mobile number and account, or a simple "no" as a response to reject the transaction payment (and which may not be necessary as the transaction will not consummate without a positive response in any case). In the case that the customer may decide not to respond, after a pre-set time lapse, the mobile operator will consider the customer's inaction as a "no" and reject the transaction payment.

If, however, the customer wants to approve the transaction payment, the customer replies to the mobile operator's text message by simply sending a text message with their PIN Code for authentication purposes, allowing the mobile operator to then deduct or bill the amount to the customer's mobile number account. Upon receiving the PIN Code text message and having authenticated the customer's PIN Code, the mobile operator debits the customer's account balance for the total amount (e.g., including any additional mobile operator surcharges). The mobile operator then sends approval to the payment processor creating a liability to pay the net amount due as per the terms agreed between the two parties. By contrast, most conventional systems bill the customer's financial institution (e.g., a credit card company, bank, etc).

The payment processor sends the approval to the retailer, creating a liability to pay the retailer the net amount due as per the terms agreed between the two parties. The retailer, upon receiving the approval from the payment processor, concludes the transaction and sends the customer a receipt via text message and/or other means such as email, mail, and the like. Advantageously, the retailer can include shipping information, promotional messages and/or coupons along with or following the receipt to the customer.

Figure 2:
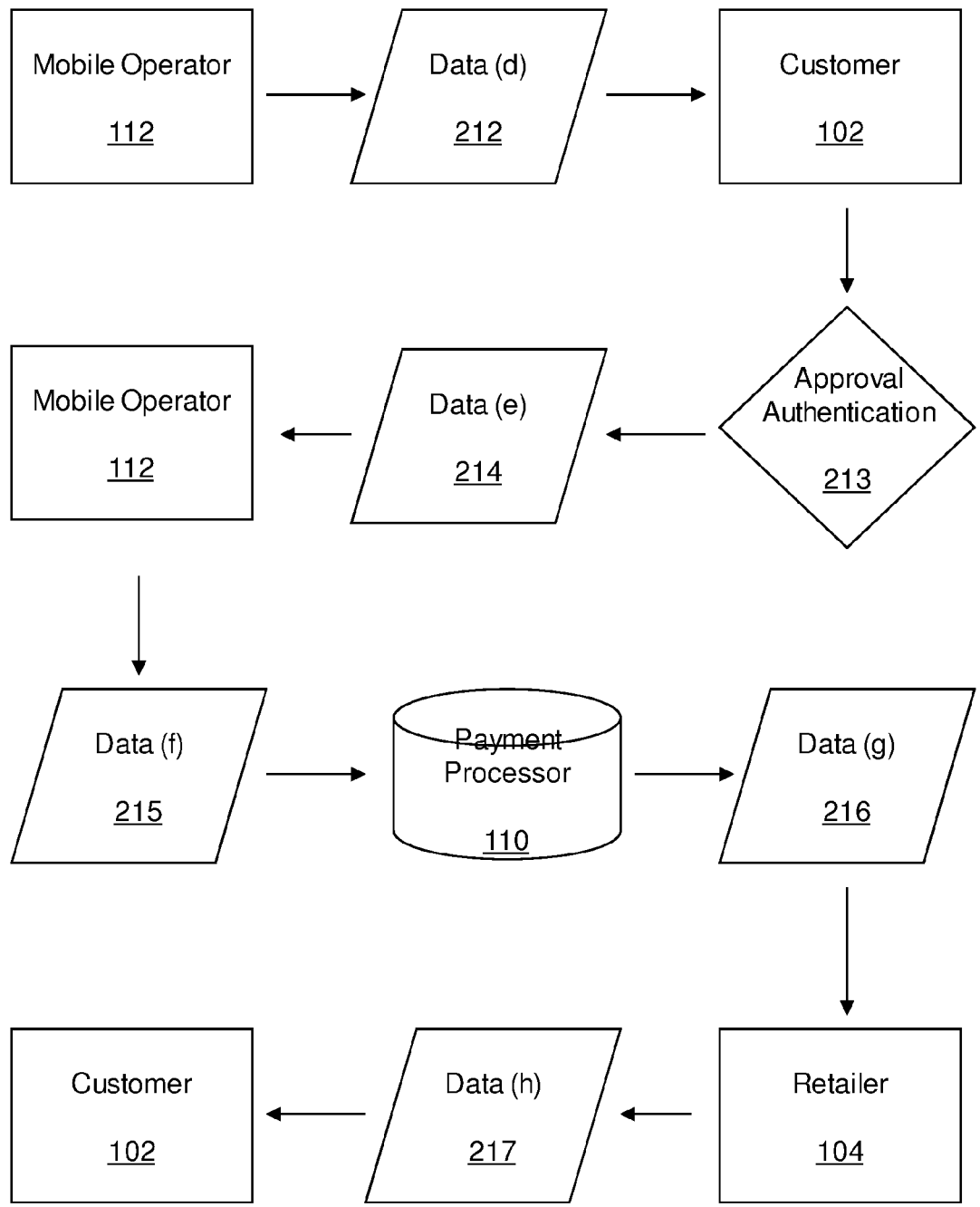

Referring now to the drawings, wherein like reference numerals designate identical or corresponding parts throughout the several views and more particularly to FIGS. 1-2 thereof there is illustrated an exemplary general process flow, according to an exemplary embodiment. In FIG. 1, the process begins with customer 102 who interfaces/interacts 103 with a retailer's 104 store, e-store (e.g., web site), telephone sales persons, interactive voice response (IVR) system, vendor, restaurant, other such interface, and the like, and including personal face-to-face, purchase/consumption of goods and/or services. Customer 102 selects/purchases or consumes goods and/or services 105 from retailer 104 and proceeds to pay for it at check-out 106 where he has several payment options to choose from. Customer 102 chooses a mode of payment 107. The retailer 104 requests customer's mobile number and related billing data 108 of customer 102. Customer 102 provides data (a) 108 relating to his mobile number, mobile operator 112 and may or may not need to provide the country that the phone number is registered and issued in. Retailer 104 packages the customer 102 data (a) 108 and adds his invoice detail and sends data (b) 109 to a payment processor 110. Payment processor 110 adds their own transaction ID and other relevant information, to the retailer's data (b) 109 and sends data (c) 111 to the customer's 102 mobile operator 112.

In FIG. 2, the mobile operator 112 adds their transaction ID, other relevant information, and or any additional charges to the retailer's invoice and packages it as data (d) 212 and sends it as a Text message (e.g., a SMS text message, etc.) to the customer's 102 mobile number requesting approval or rejection of payment using a means of authentication/authorization with their PIN Code, or "no," or ignoring the message (with a pre-set time lag) to reject the approval request. Customer 102 by authenticating/authorizing 213 approves the charge using a PIN Code sent via a reply through text message data (e) 214 to the mobile operator 112, confirming the payment approval. Mobile operator sends an approval/confirmation data (f) 215 package to the payment processor 110 creating a liability to pay as per the terms agreed between the two parties. Payment processor 110 sends approval confirmation with relevant transaction data (g) 216 to the retailer 104 creating a liability to pay as per the terms agreed between the two parties. Retailer 104 prepares receipt and sends data (h) 217 via text message and/or email or other such means, including but not limited to, mail to customer 102 to conclude the transaction. The data may include shipping and promotional information.

Figure 3:
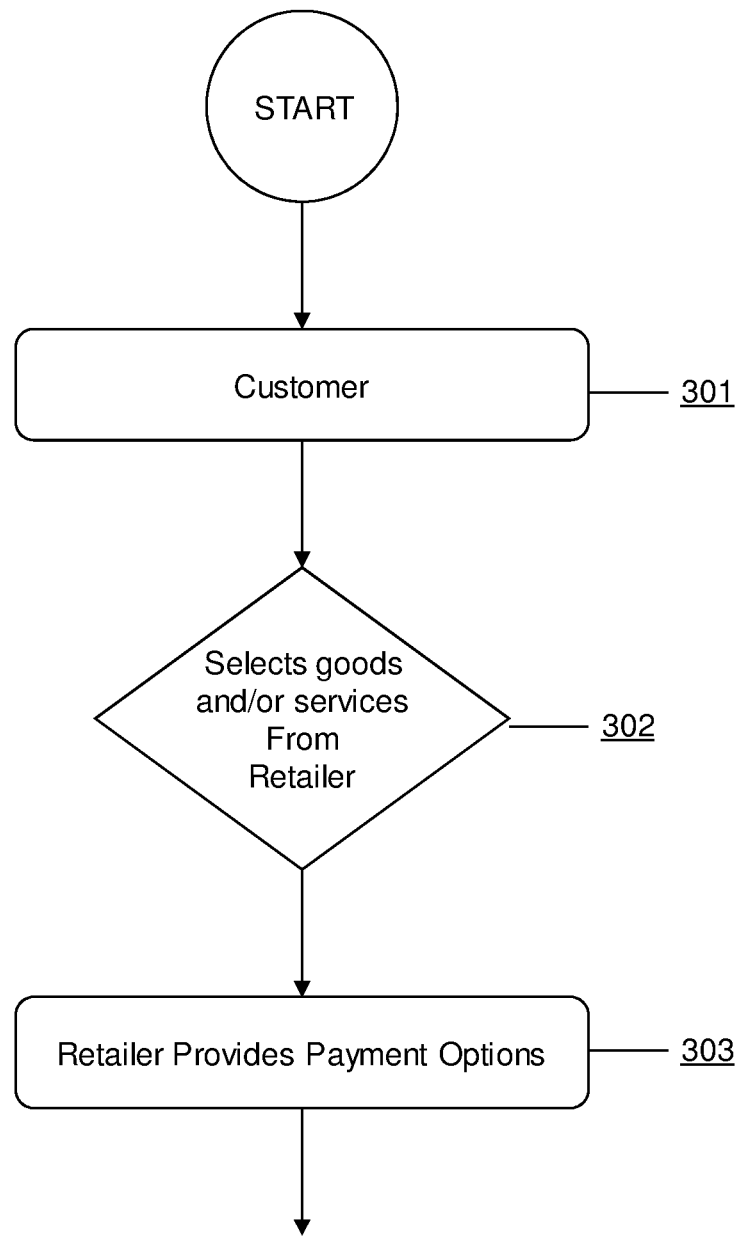
FIGS. 3-7 illustrate an exemplary flow chart corresponding to the exemplary process of FIGS. 1-2.

FIGS. 3-7 illustrate an exemplary flow chart corresponding to the exemplary process of FIGS. 1-2. In FIG. 3, the customer 301 selects goods and/or services, for example, from a retailer/vendor/merchant at step 302 at a store, on the internet, vendor, vending machine, restaurant, mobile browser, through a telephone sales person or sales IVR, and/or other such sales avenues/interfaces as the customer may be presented with by the retailer. Retailer at step 303 presents the customer with various payment options, for example, including cash, credit card, debit card, mobile wallet, mobile phone number or account, bank transfer, stored value cards, and others.

Figure 4:
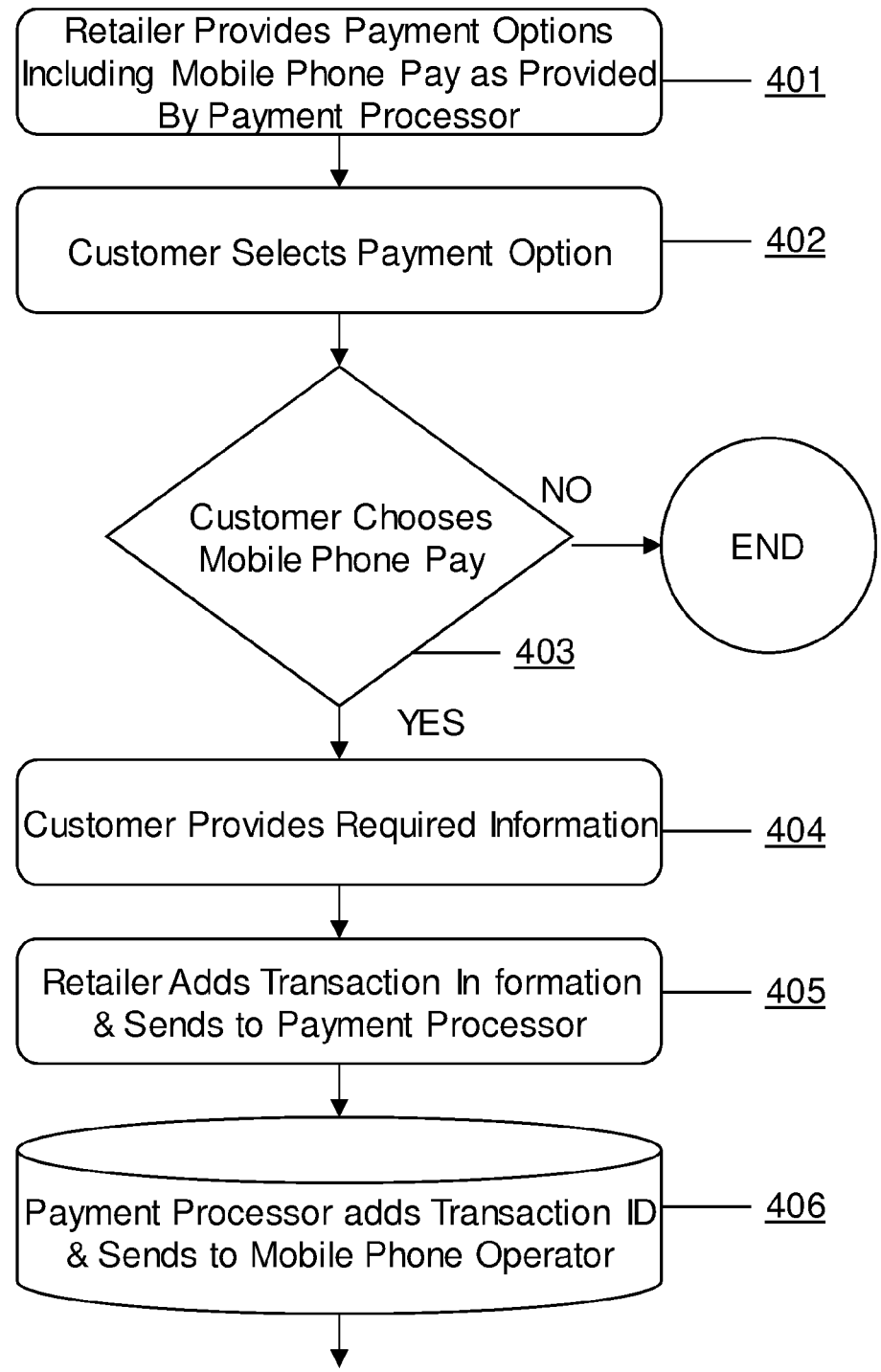

In FIG. 4, the retailer presents various payment options at step 401 to the customer who selects a payment option at step 402 and chooses to pay with the customer's mobile number at step 403. Should the customer not choose to pay using the mobile number, step 403 ends the process. Customer provides information related to their mobile number for billing at step 404 whereby the information can include, for example, mobile phone number, mobile operator and the country the mobile number and mobile operator are registered in. Retailer adds transaction details at step 405, for example, including retailer name and ID, store number, invoice number, goods and/or services purchased, amount billed and payable by customer and sends it to the payment processor to seek payment approval, authorization and authentication from the customer and the customer's mobile operator's agreement, and that of the payment processor to pay the retailer on behalf of the customer. Payment processor adds a unique transaction ID code at step 406 related to the information received by the retailer (e.g., whose account would already exist in the database of the payment processor) and any other information that may be relevant, and sends it across to the customer's mobile operator (whose account would also already exist in the database of the payment processor).

Figure 5A:
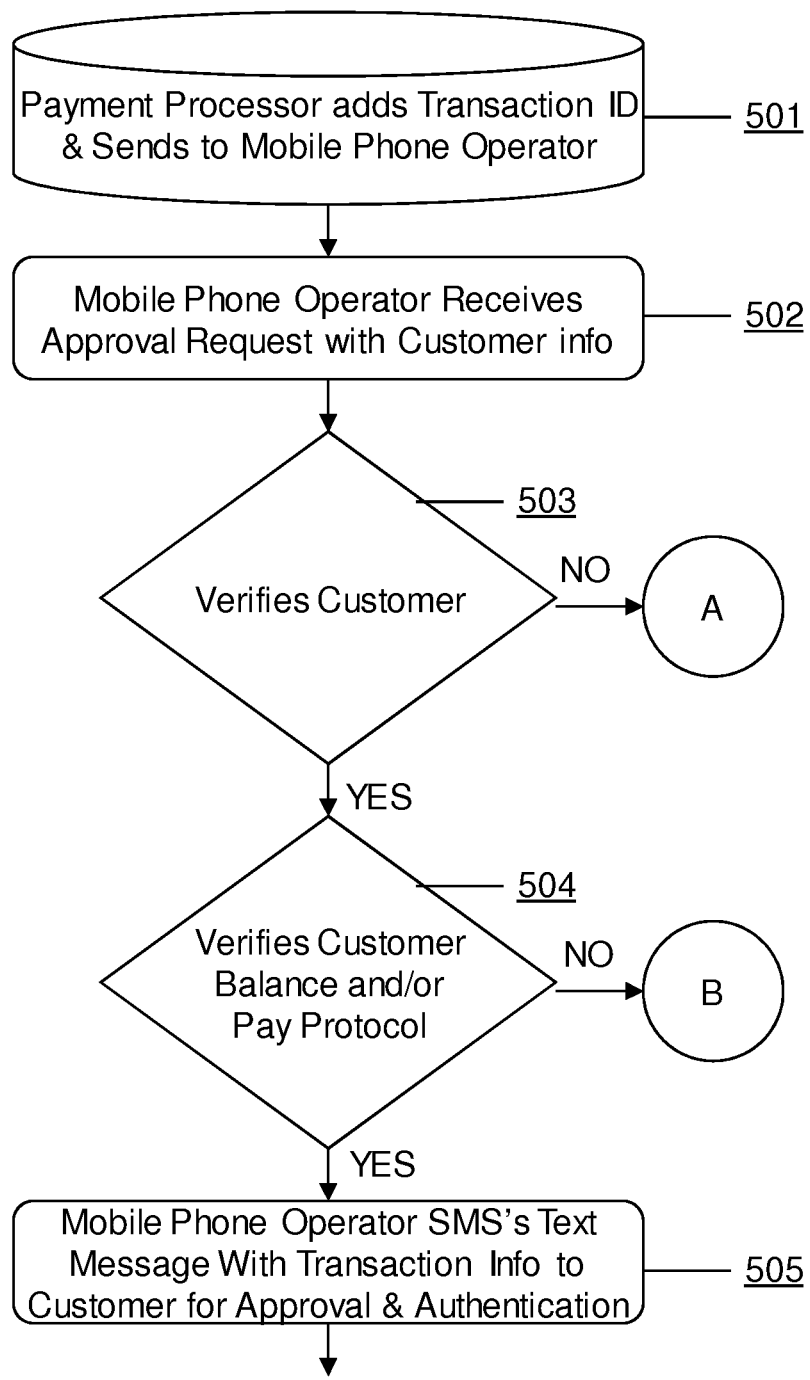

In FIG. 5A, the payment processor sends the transaction data and ID and the amount payable by the customer to the customer's mobile operator at step 501 who receives it at step 502 and verifies the customer at step 503. If the customer's mobile number is not verified as a customer of the mobile operator, then the error is referred to the payment processor and further detailed in FIG. 5B. If the mobile operator confirms the customer, it then proceeds to check their balance in the case of, for example, pre-paid customers, and/or the payment limit protocols as may be set/mutually agreed with the mobile operator in the case of, for example, post-paid customers at step 504. If the pre-paid customer's balance is insufficient or the post-paid customer has exceeded their payment limit protocol, then the low balance or limit exceeded message is sent to the customer via text message and further detailed in FIG. 5C. If the balance and payment limit protocol is sufficient to cover the payment due to the retailer and an additional charge that may or may not be levied by the mobile operator, the customer is then sent a text message requesting approval for the mobile operator to charge the customer's mobile number to pay the retailer for the transaction at step 505. The request for approval message includes, for example, information stating the retailer's name, total owed for purchases, plus the mobile operator charge (if applicable) and a request for approval by replying with the customer's PIN Code (that would've been already registered by the customer with the mobile operator for accessing voice mail and/or value added services and/or specifically created to access this transaction payment facility) in a text message to the mobile operator. To reject, the customer would need to send "NO" as a response or just ignore the message and a pre-set time lapse protocol at the mobile operator's end would consider no response from the customer as a rejection.

Figure 5B:
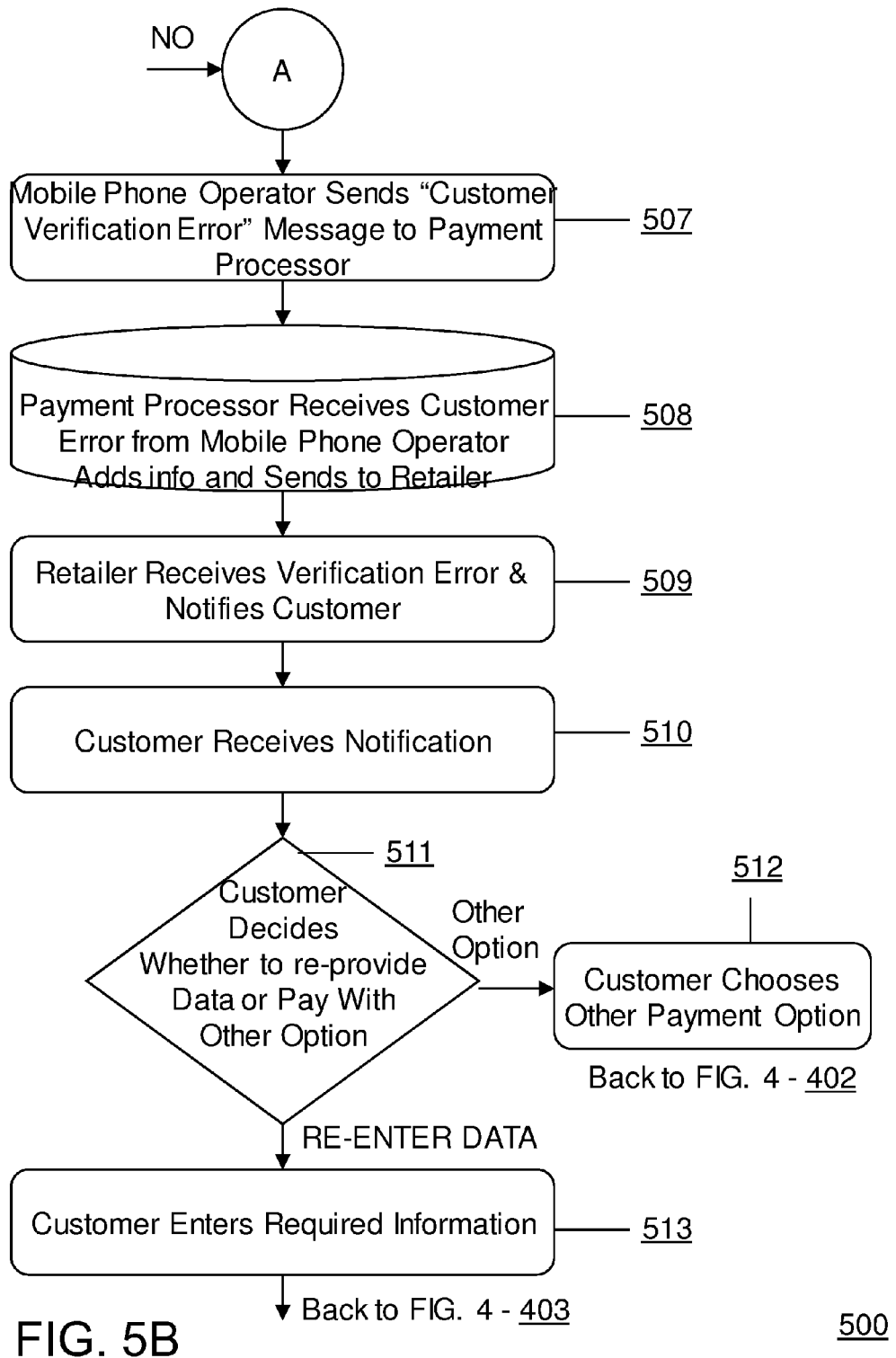

FIG. 5B illustrates the steps associated with a customer verification error generated by the mobile operator in FIG. 5A step 503. In FIG. 5B, the mobile operator sends the payment processor a "customer verification error" indicating that the mobile number (hence the customer) as indicated by the retailer's data doesn't exist with the mobile operator at step 507. The payment processor sends the mobile operator's message along with the transaction ID (and other data that may be applicable) to the retailer identifying the customer's mobile number error 508. Retailer receives the error and notifies the customer at step 509. Customer receives notification of error at step 510. Customer then decides whether to correct the error and provide their mobile number again or to use another payment option at step 511. In case customer decides to choose another payment option at step 512, retailer will provide that and go to process step as indicated in FIG. 4 step 402. If the customer decides to provide the retailer with their mobile phone number at step 513, the retailer performs step 403 of FIG. 4.

Figure 5C:
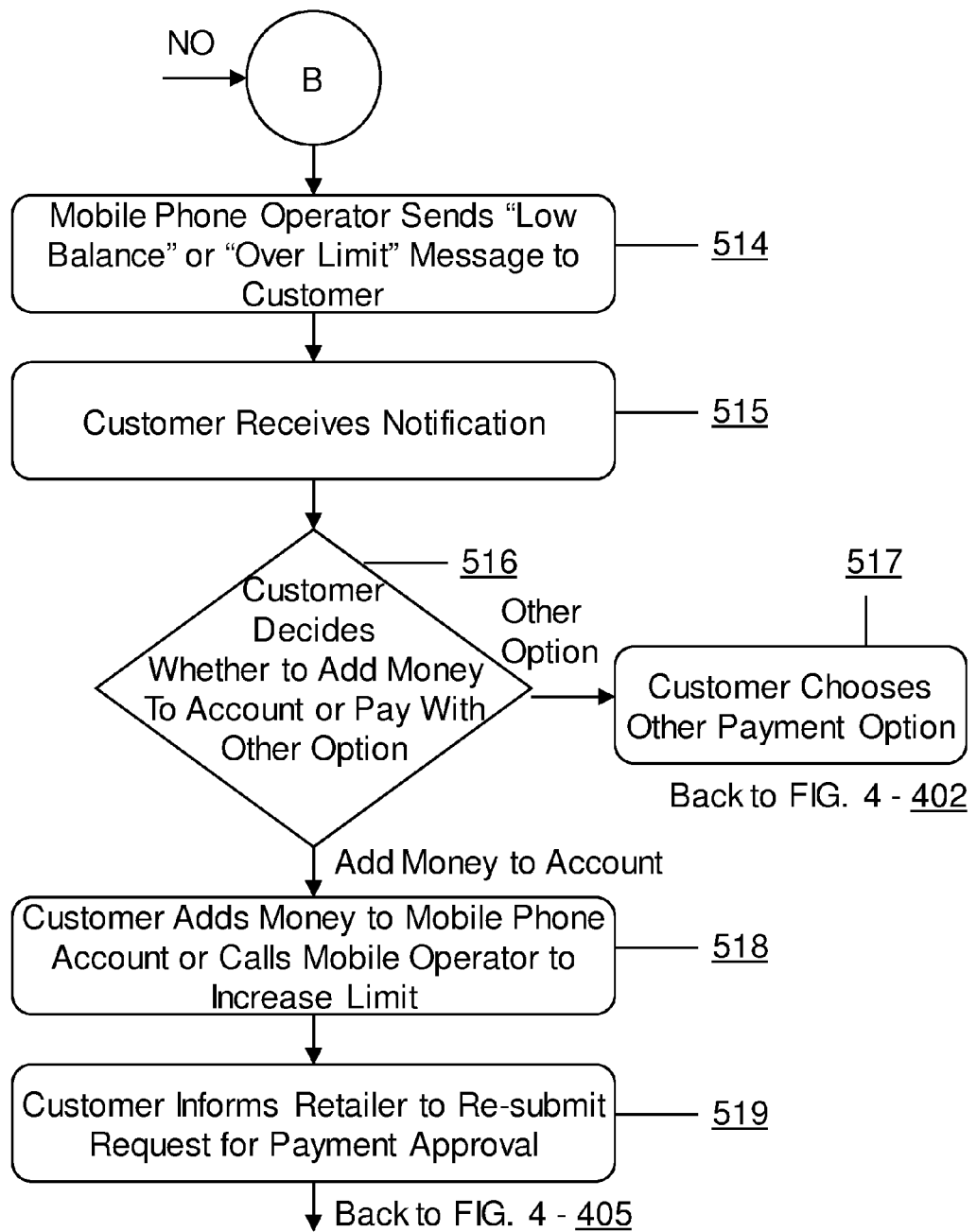

FIG. 5C illustrates the steps associated with a customer's account balance with the mobile operator being insufficient to pay the total amount of the transaction (including mobile operator charge where applicable) or the customer's payment protocol limit has or would exceed with the amount that is payable for the transaction (including mobile operator charge where applicable). In FIG. 5C, the mobile operator sends the customer a notification regarding this issue at step 514. Customer receives the notification at step 515 and then decides whether or not to add money to their mobile phone account or to pay with another method/option at step 516. In case customer decides to choose other option at step 517, retailer will provide that at step 402 of FIG. 4. If the customer decides to add money to their mobile phone account balance or increase their payment limit at step 518, then they would need to inform the retailer at step 519 to re-submit their mobile number payment information as in FIG. 4 step 405.

Figure 6A:
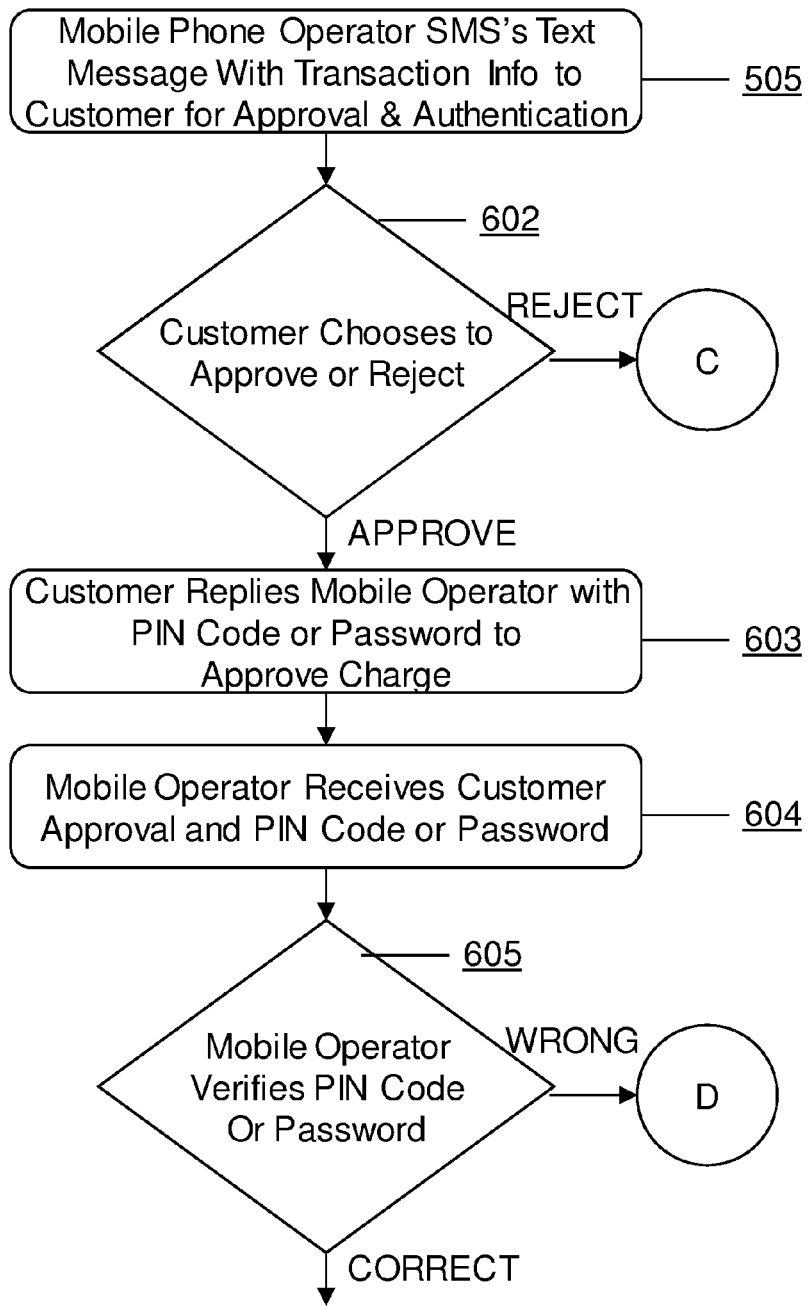

In FIG. 6A, the step 505 from FIG. 5A is shown, whereby the mobile operator sends the customer a text message with the transaction information, including but not limited to, retailer's name, total amount payable to retailer, may or may not add mobile operator surcharge, and a request to approve or reject payment by replying with a text message to the mobile operator with either their PIN Code to approve the payment for the transaction, or reply "no" or simply ignore the message to affect a time lapse protocol at the mobile operator's end to reject the payment approval. Should the customer decide to reject the payment approval request by either replying "no" or simply ignoring the message and thus affecting a time lapse rejection protocol at the mobile operator end at step 602, then the process is further detailed in FIG. 6B. If the customer approves the payment by sending their PIN Code in a text message reply to their mobile operator at step 603, then the mobile operator receives the PIN Code at step 604, verifies it at step 605 and if correct, logs it as acceptance of the customer to be charged the total amount to the mobile number balance or bill. If the PIN Code fails the mobile operator authentication, the process is further detailed in FIG. 6C.

Figure 6B:
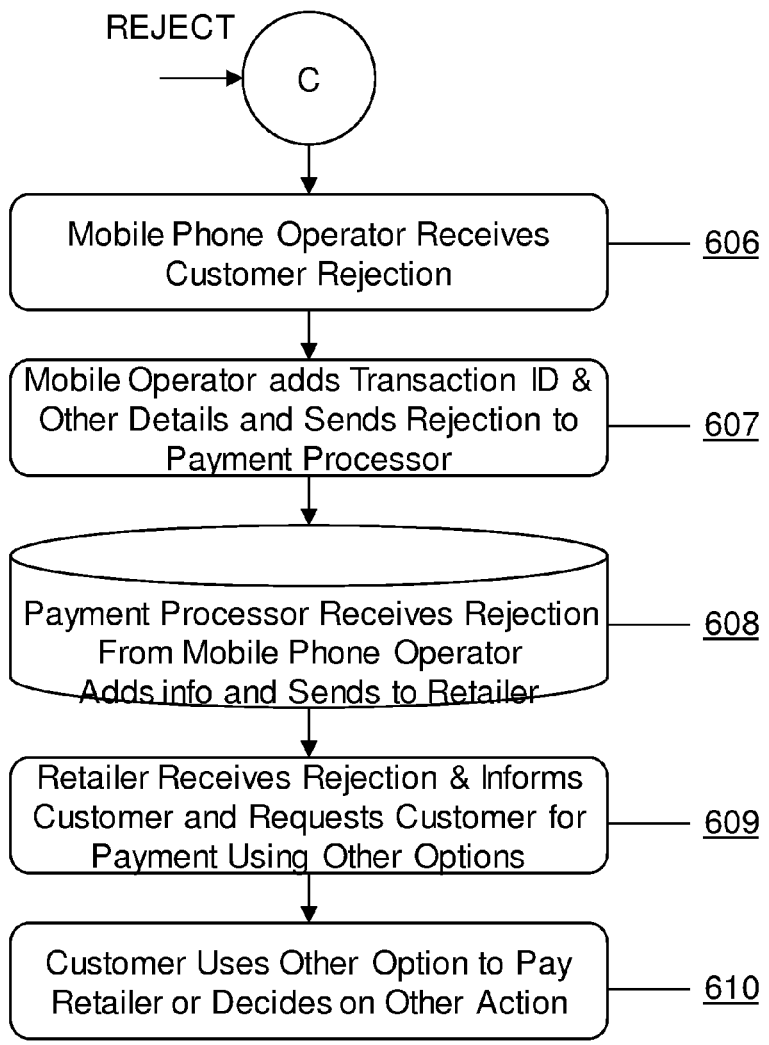

FIG. 6B describes steps of the process in the case where the customer rejects the approval to pay and the mobile operator logs the customer's rejection to pay at step 606 and sends the payment processor a notification of customer's rejection of payment along with the transaction ID and other relevant information at step 607. In FIG. 6B, the payment processor tags and sends the rejection notification to the retailer at step 608 who receives it at step 609 and informs the customer to choose another payment option. Customer uses another payment option at step 610, which goes to step 402 in FIG. 4 to choose a payment option.

Figure 6C:
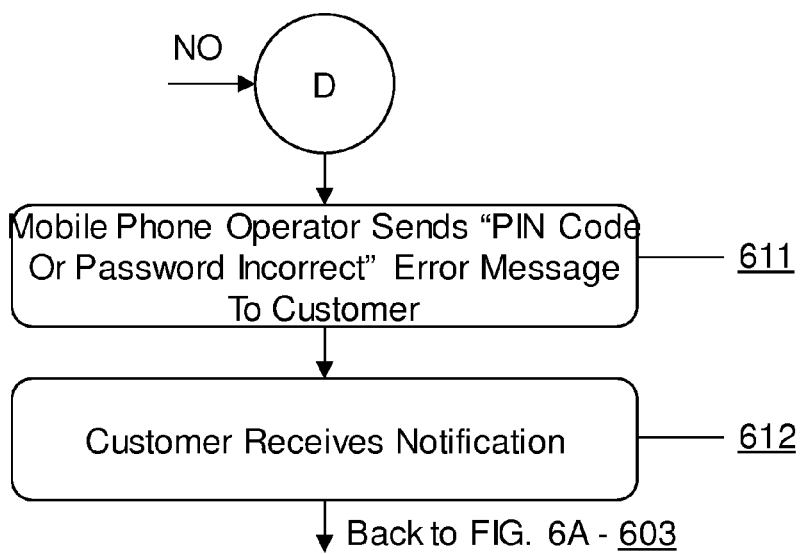

FIG. 6C describes steps of the process in the case where the PIN Code approval text message sent by the customer doesn't authenticate with the mobile operator's log of the customer's PIN Code authentication and the mobile operator then sends the error message to the customer at step 611. In FIG. 6C, the customer receives the notification at step 612 and follows the steps as per the process detailed in FIG. 6A, step 603. This loop for PIN Code can be a predetermined amount times before it is understood that the customer can't remember their PIN Code and would be automatically treated as a rejection and the payment processor would be informed accordingly. For example, the customer can be sent a final text message by the mobile operator asking them to contact customer service for help.

Figure 7:
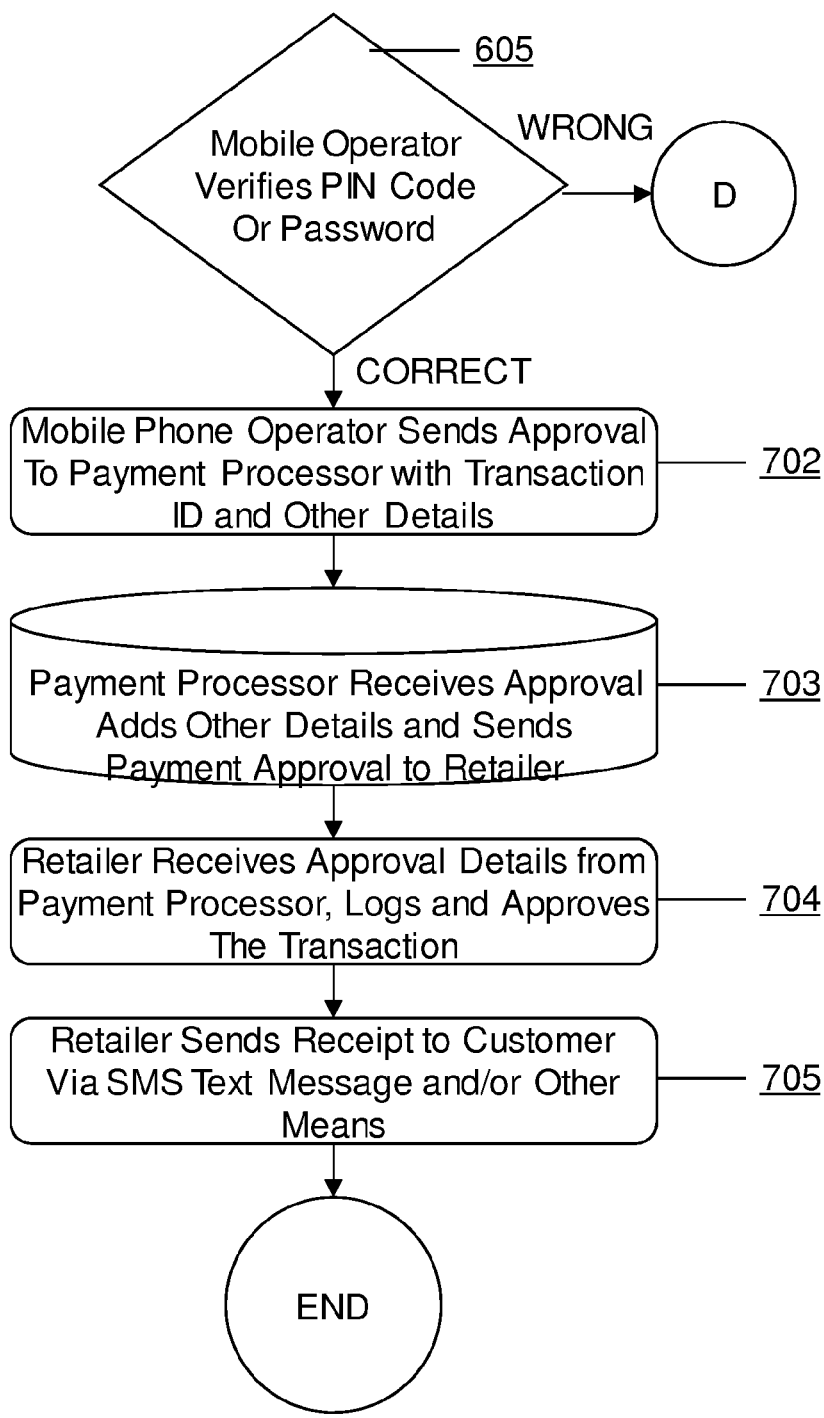

FIG. 7 describes the continuation of the process step 605 from FIG. 6A, where the mobile operator verifies the customer's PIN Code successfully, and at step 702 sends approval to the payment processor indicating the net amount that is payable between the two parties as per their agreement. In FIG. 7, payment processor receives the approval notification and adds other transaction approval information and sends an approval notification to the retailer indicating the net amount that is payable between the two parties as per their agreement at step 703. The retailer receives the payment processor's approval notification and logs it as transaction payment approved and cleared by the customer and payment owed by the payment processor at step 704. The retailer also sends the customer a receipt via text message and/or email or other means such as, but not limited to, mail, indicating they have received indication of payment clearance and may include shipping and promotional information and/or a customer service number at step 705, concluding the transaction payment process.

Advantageously, the novel method allows a customer to pay a retailer through their mobile operator via a payment processor. This method protects the financial information of the customer and their identity that is susceptible to theft and exploitation by malicious acts by parties that may or may not be part of the payment process. The present method as described above virtually presents an anti-fraudulent payment system that provides peace of mind and convenience to customers as they and their mobile operator are the only ones who know the PIN Code to authorize payments to retailers.

Figure 8:
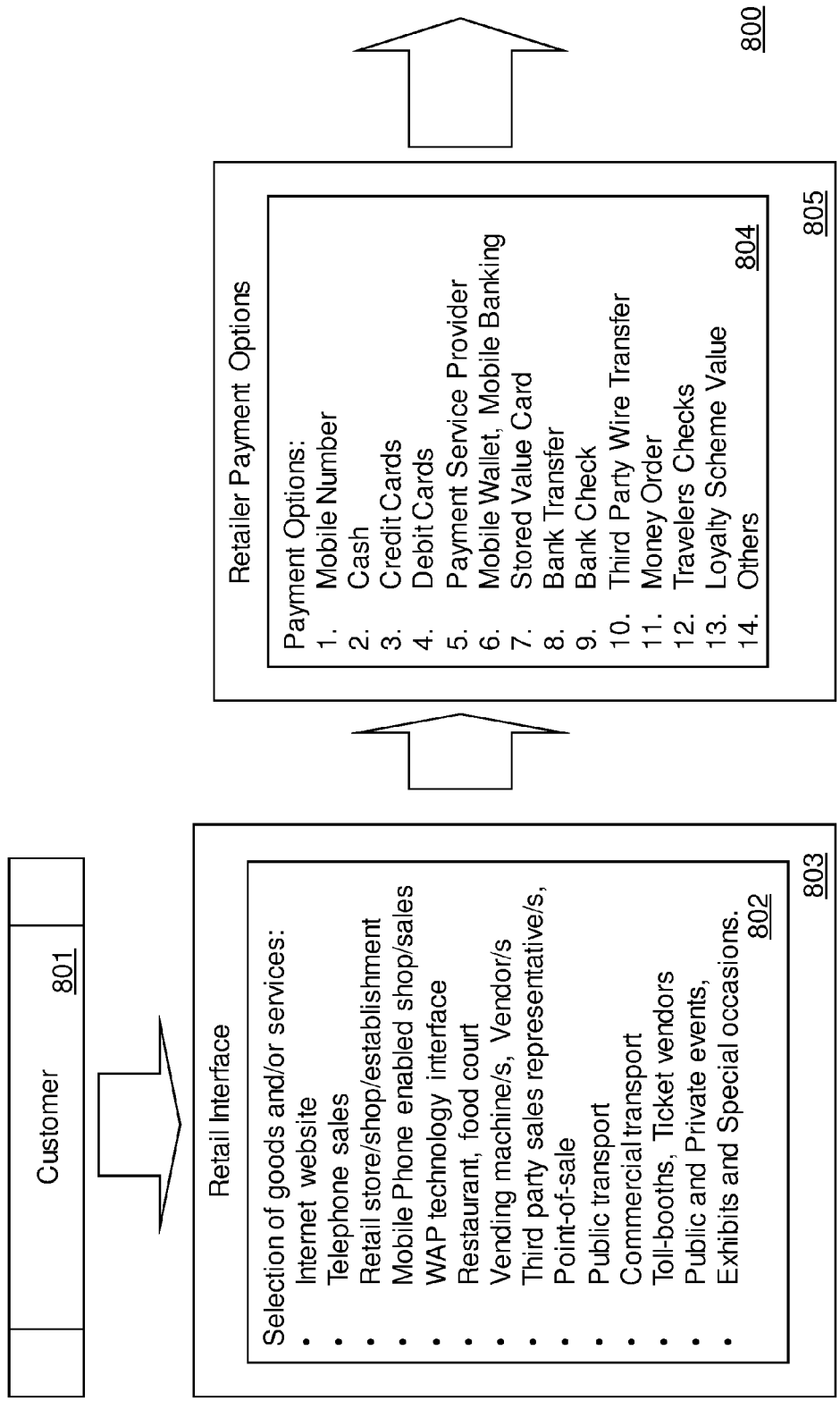
FIGS. 8-11 illustrate the operation of an exemplary system corresponding to the exemplary process and flow chart of FIGS. 1-7.

FIGS. 8-11 illustrate the operation of an exemplary system corresponding to the exemplary process and flow chart of FIGS. 1-7. In FIG. 8, there is illustrated the mobile number payment system 800, according to an exemplary embodiment of the present invention. The system 800, begins with the customer 801 who interacts with a retailer's interface 803 whereby selecting goods and/or services presented by the retailer to the customer to select and/or consume 802 through a variety of ways including, for example, retailer's Internet website (e-commerce/e-retail, shop/sales front), telephone sales/retail/catalogue shop/team (call center, catalogue sales), mobile phone enabled shop/sales presence using, for example, Wireless Application Protocol (WAP) technologies, and the like, interfacing with, for example, the internet, physical store front or other such establishment in the form of retail store/shop, including, for example, restaurants, vending machines, vendors, third party representatives, point-of-sale including, for example, services such as payment mechanisms configured for public transport such as taxis, buses, subways/metro/underground and over ground transport/trains/monorails, commercial aircraft/airlines/buses and other transport, toll-booths, ticket vendors/stands/internet sites for public and private events, exhibits and special occasions, and the like.

The customer selects/consumes goods and/or services and proceeds to pay for it at which point, the retailer provides payment options 805 that they accept. The payment options include, for example, mobile number/account, cash, credit cards, debit cards, payment service provider, mobile wallet, mobile banking, stored value card, bank transfer, third party wire transfer, money order, travelers' checks, loyalty scheme value, and other such methods.

Figure 9:
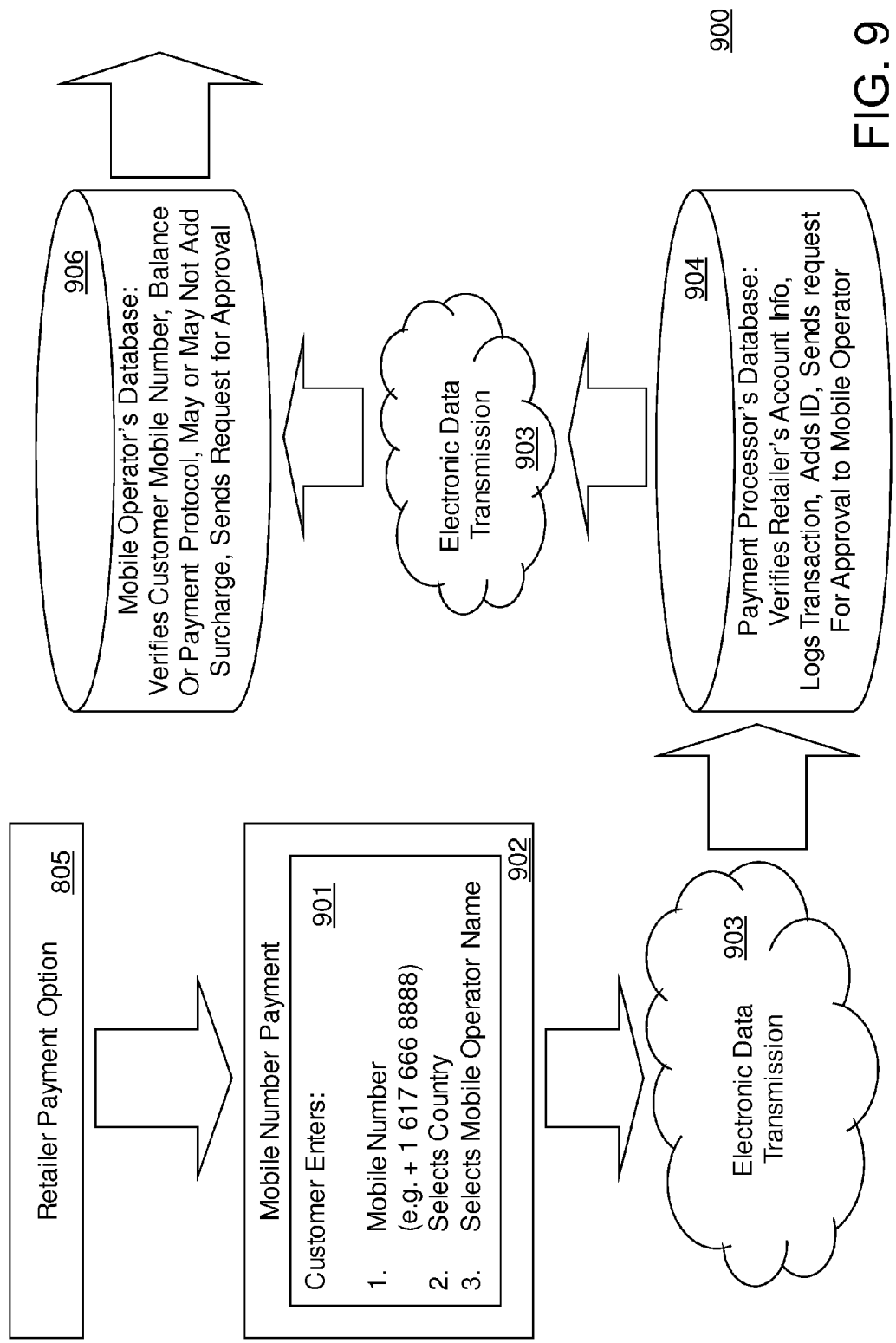

In FIG. 9, the customer selects the mobile phone number/account option 805 for mobile number payment 902 to pay the retailer and provides the retailer details 901 of their account. Customer enters details 901 include the following information, for example, a mobile account/number, indicates the country that it belongs to and the name of the mobile operator. The retailer packages the customer's mobile data and the invoice details for the customer's purchase and electronically sends the data via electronic transmission 903 to a payment processor's database 904 through/over/using electronic data transmission means 903, for example, including: world wide web, the internet, point of sale, mobile phone with minimum of SMS text messaging capability, WAP enabled wire or wireless device which may or may not be a mobile phone, telephone and/or telephone call, interactive voice response over phone or mobile phone, telephone input system using interactive selection response (example: press "1" to select Country, Press "2" to select Operator, etc.), on paper, facsimile transmission, via email, postal mail, encrypted information transportability software running on devices capable of receiving and sending such encrypted information over, but not limited to wireless networks, telephone lines, cable networks, internet, mobile networks, and the like.

The payment processor's database 904 identifies the retailer and the data 901, logs the transaction, generates a transaction ID and sends the retailer's payment charge and approval request to the customer's mobile operator's database 906 through/over/using electronic data transmission means 903, for example, including: world wide web, the internet, point of sale, mobile phone with minimum of SMS text messaging capability, WAP enabled wire or wireless device which may or may not be a mobile phone, telephone and/or telephone call, interactive voice response over phone or mobile phone, telephone input system using interactive selection response (example: press "1" to enter customer's mobile number, Press "2" to enter charge, etc.), on paper, facsimile transmission, via email, postal mail, encrypted information transportability software running on devices capable of receiving and sending such encrypted information over, but not limited to wireless networks, telephone lines, cable networks, internet, mobile networks, and the like.

Figure 10:
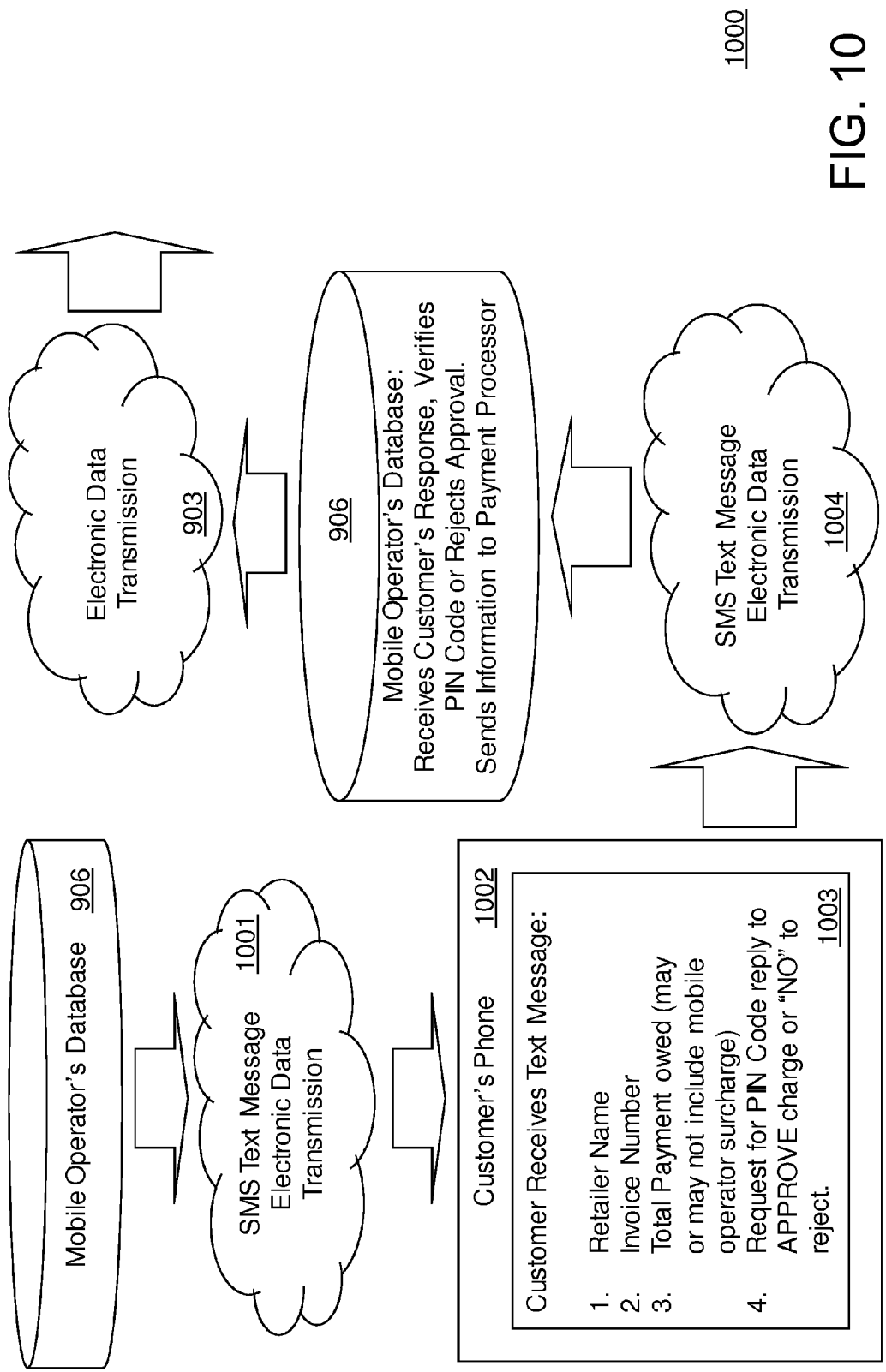

In FIG. 10, the mobile operator's database 906 receives the data, verifies the customer's mobile phone/account number, checks whether it has sufficient balance or is within the defined payment protocol as may have been agreed between customer and mobile operator, to pay for the retailer's charge (and the mobile operator's surcharge if any). Upon positive verification, the mobile operator's database 906 sends the customer a request via, for example, SMS text message 1001 on their mobile phone 1002 for approval and authorization with the information 1003, for example, including: retailer's name from which the customer has purchased goods and/or services, retailer's invoice number, total payment owed (and the mobile operator's surcharge if any), and a request for the customer to reply the SMS text message back with their unique PIN Code to approve or "NO" or ignore the message to reject the charge.

Customer replies the mobile operator's message by sending their unique PIN Code to the mobile operator's database 906 via, for example, SMS text message 1004 to approve that mobile operator can charge the total amount and deduct it from their mobile account balance or bill it to their monthly mobile account bill. The mobile operator's database 906 receives the SMS text message 1004 from the customer, verifies the PIN Code and deducts the charge from the customer's account balance or adds it to their monthly mobile phone bill.

Figure 11:
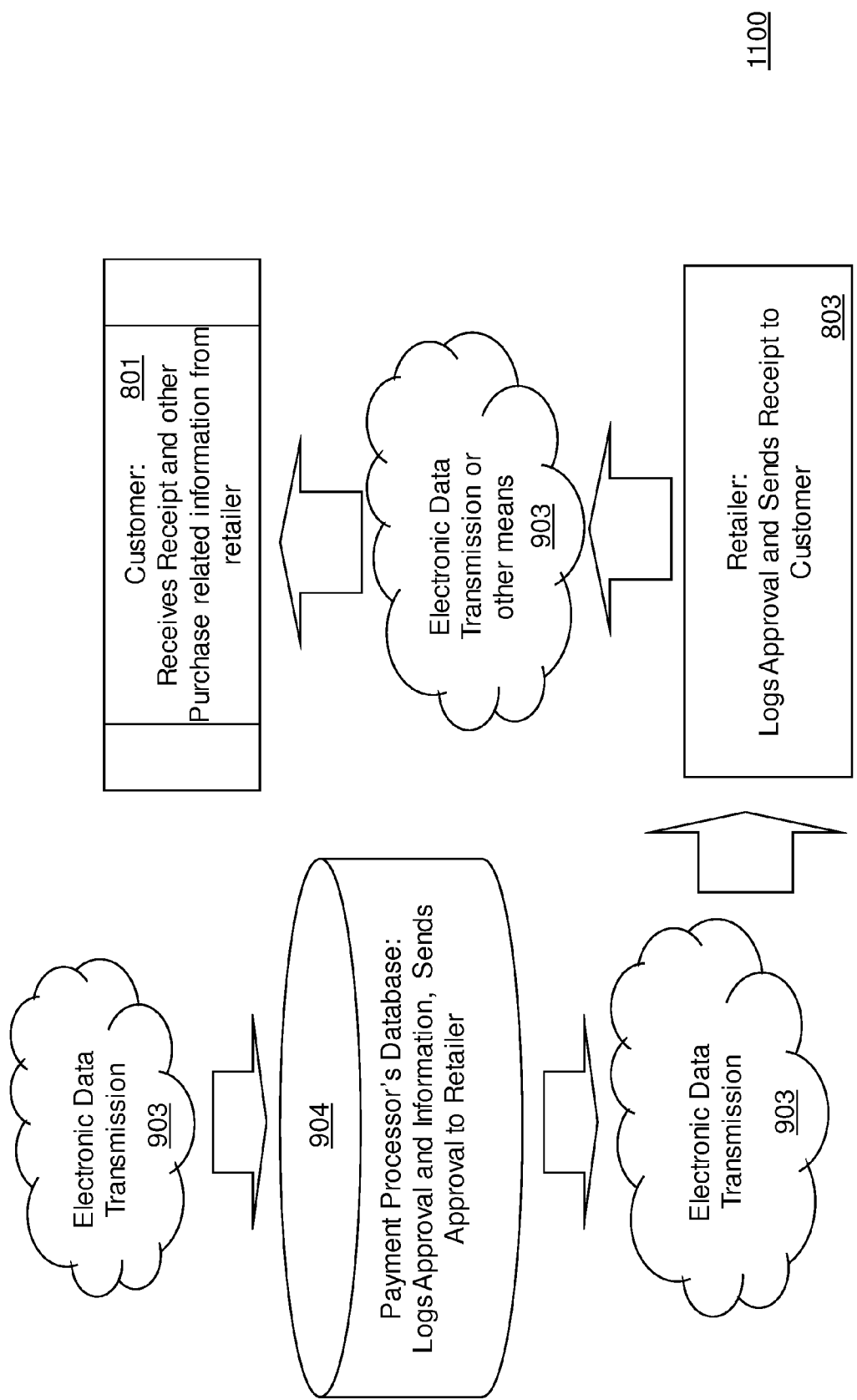

In FIG. 11, the mobile phone operator's database 906 generates an approval message along with the original transaction ID and sends it to the payment processor's database 904 through/over/using electronic data transmission means 903, for example, including: world wide web, the internet, point of sale, mobile phone with minimum of SMS text messaging capability, WAP enabled wire or wireless device which may or may not be a mobile phone, telephone and/or telephone call, interactive voice response over phone or mobile phone, telephone input system using interactive selection response (example: press "1" to select Approval, Press "2" to select Rejection, press "3" to enter transaction ID, etc.), on paper, facsimile transmission, via email, postal mail, encrypted information transportability software running on devices capable of receiving and sending such encrypted information over, but not limited to wireless networks, telephone lines, cable networks, internet, mobile networks.

The payment processor's database 904 receives the approval from the mobile operator's database 906 via electronic data transmission 903 and logs the approval and information, debits the operator's account with the amount due by the operator under the agreed terms between the two parties, creates a liability to pay the retailer in their account as per the terms agreed between the two parties and sends an approval to the retailer 803 through/over/using electronic data transmission means 903, for example, including: world wide web, the internet, point of sale, mobile phone with minimum of SMS text messaging capability, WAP enabled wire or wireless device which may or may not be a mobile phone, telephone and/or telephone call, interactive voice response over phone or mobile phone, telephone input system using interactive selection response (example: press "1" to select Approval, Press "2" to select Rejection, press "3" to enter transaction ID, etc.), on paper, facsimile transmission, via email, postal mail, encrypted information transportability software running on devices capable of receiving and sending such encrypted information over, but not limited to wireless networks, telephone lines, cable networks, internet, mobile networks.

The retailer 803 receives the approval from the payment processor 904, logs it in their books and generates a payment receipt which is sent to the customer 801. The receipt can be sent through/over/using electronic data transmission means 903, for example, including:: world wide web, the internet, point of sale, mobile phone with minimum of SMS text messaging capability, WAP enabled wire or wireless device which may or may not be a mobile phone, telephone and/or telephone call, interactive voice response over phone or mobile phone, telephone input system using interactive selection response (example: press "1" to select Approval, Press "2" to select Rejection, press "3" to enter transaction ID, etc.), on paper, facsimile transmission, via email, postal mail, encrypted information transportability software running on devices capable of receiving and sending such encrypted information over, but not limited to wireless networks, telephone lines, cable networks, internet, mobile networks. The customer 801 receives the receipt and other relevant information to their purchase, including but not limited to shipping information, promotional offers, promotional coupons, promotional bar-codes, gift certificates, etc.

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts. Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of the appended claims.

What is claimed is:

1. A computer implemented system for processing payments for goods or services, the system comprising:
   a payment processor configured to receive a payment request for goods or services from a merchant, wherein the payment request includes a mobile phone number associated with a mobile phone account of a user;
   the payment processor based on the payment request is configured to send a payment authorization request to a mobile operator servicing the mobile phone account of the user;
   the mobile operator based on the payment authorization request is configured to send over a mobile network of the mobile operator a payment authorization request text message to a mobile phone of the user connected to the mobile network of the mobile operator requesting authorization for payment of the payment request;
   the mobile phone of the user based on payment authorization request text message is configured to send over the mobile network of the mobile operator a payment authorization text message including a personal identification number of the user associated with the mobile phone number of the user to the mobile phone operator for authorization of payment of the payment request;

the mobile operator is configured to receive the payment authorization text message including the personal identification number of the user over the mobile network of the mobile operator for verification;

the payment processor is configured to receive a payment authorization from the mobile phone operator based on the payment authorization text message for authorizing or not authorizing the payment of the payment request;

if the payment authorization from the mobile phone operator authorizes the payment of the payment request, the payment processor is configured to pay the merchant for the goods or services from an account of the mobile phone operator, wherein the mobile phone operator charges the mobile phone account of the user for the payment; and if the payment authorization from the mobile phone operator does not authorize the payment of the payment request or if the payment authorization text message is not received by the mobile operator over the mobile network of the mobile operator within a predetermined period of time, the payment processor is configured to decline to pay the merchant for the goods or services, and wherein no financial information of the user nor the personal identification number of the user are sent to the payment processor.

2. The system of claim 1, wherein the mobile operator is configured to check an account balance and/or charge protocols of the mobile phone account for payment for the goods or services and additional charges levied by the mobile operator.

3. The system of claim 1, wherein the payment authorization request text message includes details of the merchant and a total amount payable which can include additional charges by the mobile operator.

4. The system of claim 1, wherein the merchant is configured to send a message to the user including shipping information, promotional messages and/or coupons along with or following a receipt to the user.

5. A computer implemented method for processing payments for goods or services, the method comprising:

receiving by a payment processor a payment request for goods or services from a merchant, wherein the payment request includes a mobile phone number associated with a mobile phone account of a user;

sending by the payment processor based on the payment request a payment authorization request to a mobile operator servicing the mobile phone account of the user;

sending by the mobile operator based on the payment authorization request a payment authorization request text message over a mobile network of the mobile operator to a mobile phone of the user connected to the mobile network of the mobile operator requesting authorization for payment of the payment request;

sending by the mobile phone of the user based on payment authorization request text message a payment authorization text message over the mobile network of the mobile operator including a personal identification number of the user associated with the mobile phone number of the user to the mobile phone operator for authorization of payment of the payment request;

receiving by the mobile operator the payment authorization text message including the personal identification number of the user over the mobile network of the mobile operator for verification;

receiving by the payment processor a payment authorization from the mobile phone operator based on the payment authorization text message for authorizing or not authorizing the payment of the payment request;

if the payment authorization from the mobile phone operator authorizes the payment of the payment request, the payment processor is configured to pay the merchant for the goods or services from an account of the mobile phone operator, wherein the mobile phone operator charges the mobile phone account of the user for the payment; and if the payment authorization from the mobile phone operator does not authorize the payment of the payment request or if the payment authorization text message is not received by the mobile operator over the mobile network of the mobile operator within a predetermined period of time, the payment processor is configured to decline to pay the merchant for the goods or services, and wherein no financial information of the user nor the personal identification number of the user are sent to the payment processor.

6. The method of claim 5, wherein the mobile operator is configured to check an account balance and/or charge protocols of the mobile phone account for payment for the goods or services and additional charges levied by the mobile operator.

7. The method of claim 5, wherein the payment authorization request text message includes details of the merchant and a total amount payable which can include additional charges by the mobile operator.

8. The method of claim 5, wherein the merchant is configured to send a message to the user including shipping information, promotional messages and/or coupons along with or following a receipt to the user.

9. A computer program product for processing payments for goods or services and including one or more computer readable instructions embedded on a tangible, non-transitory computer readable medium and configured to cause one or more computer processors to perform the steps of:

receiving by a payment processor a payment request for goods or services from a merchant, wherein the payment request includes a mobile phone number associated with a mobile phone account of a user;

sending by the payment processor based on the payment request a payment authorization request to a mobile operator servicing the mobile phone account of the user;

sending by the mobile operator based on the payment authorization request a payment authorization request text message over a mobile network of the mobile operator to a mobile phone of the user connected to the mobile network of the mobile operator requesting authorization for payment of the payment request;

sending by the mobile phone of the user based on payment authorization request text message a payment authorization text message over the mobile network of the mobile operator including a personal identification number of the user associated with the mobile phone number of the user to the mobile phone operator for authorization of payment of the payment request;

receiving by the mobile operator the payment authorization text message including the personal identification number of the user over the mobile network of the mobile operator for verification;

receiving by the payment processor a payment authorization from the mobile phone operator based on the payment authorization text message for authorizing or not authorizing the payment of the payment request;

if the payment authorization from the mobile phone operator authorizes the payment of the payment request, the payment processor is configured to pay the merchant for the goods or services from an account of the mobile phone operator, wherein the mobile phone operator charges the mobile phone account of the user for the payment; and if the payment authorization from the mobile phone operator does not authorize the payment of the payment request or if the payment authorization text message is not received by the mobile operator over the mobile network of the mobile operator within a predetermined period of time, the payment processor is configured to decline to pay the merchant for the goods or services, and wherein no financial information of the user nor the personal identification number of the user are sent to the payment processor.

10. The computer program product of claim 9, wherein the mobile operator is configured to check an account balance and/or charge protocols of the mobile phone account for payment for the goods or services and additional charges levied by the mobile operator.

11. The computer program product of claim 9, wherein the payment authorization request text message includes details of the merchant and a total amount payable which can include additional charges by the mobile operator.

12. The computer program product of claim 9, wherein the merchant is configured to send a message to the user including shipping information, promotional messages and/or coupons along with or following a receipt to the user.

* * * * *